United States Patent

Matsuki et al.

(10) Patent No.: US 9,379,594 B2
(45) Date of Patent: Jun. 28, 2016

(54) ELECTRIC MOTOR COOLING MEDIUM DISCHARGE STRUCTURE AND ELECTRIC MOTOR

(75) Inventors: Yasuhiko Matsuki, Fujisawa (JP); Akira Minamiura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 140 days.

(21) Appl. No.: 13/816,112

(22) PCT Filed: Mar. 8, 2012

(86) PCT No.: PCT/JP2012/056030

§ 371 (c)(1),
(2), (4) Date: Feb. 8, 2013

(87) PCT Pub. No.: WO2012/124611

PCT Pub. Date: Sep. 20, 2012

(65) Prior Publication Data

US 2013/0342045 A1 Dec. 26, 2013

(30) Foreign Application Priority Data

Mar. 14, 2011 (JP) ................................ 2011-055737

(51) Int. Cl.
*H02K 9/19* (2006.01)
*H02K 5/20* (2006.01)

(52) U.S. Cl.
CPC ... *H02K 9/19* (2013.01); *H02K 5/20* (2013.01)

(58) Field of Classification Search
CPC .................................. H02K 9/19; H02K 5/20
USPC .................................... 310/52, 54, 58, 59, 90

IPC ......................................... H02K 009/19,005/20
See application file for complete search history.

(56) References Cited

U.S. PATENT DOCUMENTS

| 4,514,652 A | * | 4/1985 | Olson | .................. H02K 5/128 310/113 |
| 5,034,638 A | * | 7/1991 | McCabria | ...................... 310/54 |

(Continued)

FOREIGN PATENT DOCUMENTS

| JP | 57-195362 U | 12/1982 |
| JP | 6-21366 U | 3/1994 |
| JP | 09-026087 A | 1/1997 |

(Continued)

OTHER PUBLICATIONS

International Search Report dated May 15, 2012, issued for PCT/JP2012/056030.

*Primary Examiner* — Thomas Truong

(74) *Attorney, Agent, or Firm* — Locke Lord LLP; James E. Armstrong, IV; Brian S. Matross

(57) ABSTRACT

It is an object to decrease an amount of a cooling medium which stays in a housing of an electric motor and is not discharged to the outside when cooling the electric motor by the cooling medium. For this reason, an electric motor includes a first discharge port which is provided in a first flange of a housing so that the cooling medium passes therethrough, a second discharge port which is provided in the first flange so that the cooling medium in the housing passing a bearing passes therethrough, and a discharge passageway which discharges the cooling medium passing the first discharge port and the second discharge port to the outside of the housing.

10 Claims, 10 Drawing Sheets

(56) References Cited

U.S. PATENT DOCUMENTS 5,744,880 A * 4/1998 Kudoh et al. .................. 310/58
5,886,433 A * 3/1999 Oda et al. ...................... 310/59

FOREIGN PATENT DOCUMENTS

| | | |
|---|---|---|
| JP | 2001-008413 A | 1/2001 |
| JP | 2007-020337 A | 1/2007 |

* cited by examiner

A-A

B-B

C-C

ELECTRIC MOTOR COOLING MEDIUM DISCHARGE STRUCTURE AND ELECTRIC MOTOR

FIELD

The present invention relates to an electric motor cooling medium discharge structure which cools an electric motor by oil, and an electric motor.

BACKGROUND

An electric motor is used for various purposes, and generates heat due to Joule heating of a coil included in a stator, and eddy current loss and hysteresis loss of a rotor core. In order to cool the electric motor, for example, a technique of cooling the electric motor using a cooling medium such as oil is proposed (Patent Literature 1).

CITATION LIST

Patent Literature

Patent Literature 1: Japanese Patent Application Laid-open No. 2007-020337

SUMMARY

Technical Problem

In the technique disclosed in Patent Literature 1, a cooling liquid extraction port is provided so as to discharge a cooling liquid (a cooling medium) from the inside of an electric motor (electric motor). However, since the cooling liquid extraction port is provided in a side portion of a motor housing (housing) of the electric motor, there is a concern that the cooling liquid at the lower portion may not be completely discharged to the outside while cooling the electric motor. As a result, there is a concern that the cooling medium in the housing of the electric motor may remain and may not be changed. It is an object of the invention to decrease the amount of the cooling medium which stays in the housing of the electric motor and is not discharged to the outside when cooling the electric motor by the cooling medium.

Solution to Problem

According to an aspect of the present invention, there is provided an electric motor cooling medium discharge structure which discharges a cooling medium cooling an electric motor having a shaft attached with a rotor core disposed in a housing from the housing, the electric motor comprising: a first discharge port which is provided in an end side member supporting the shaft through a bearing and disposed at one end of the housing and through which the cooling medium in the housing passes; a second discharge port through which the cooling medium in the housing passing the bearing provided in the end side member and supported by the end side member passes; and a discharge passageway through which the cooling medium passing the first discharge port and the second discharge port is discharged to the outside of the housing.

As a preferable aspect, it is preferable that an opening area of the first discharge port is larger than an opening area of the second discharge port.

As a preferable aspect, it is preferable that the first discharge port is disposed at the inside in relation to the inner peripheral surface of the housing.

As a preferable aspect, it is preferable that the discharge passageway extends outward in the radial direction of the shaft.

As a preferable aspect, it is preferable that the first discharge port has a larger dimension in a direction parallel to the radial direction of the shaft than a dimension in a direction perpendicular to the radial direction of the shaft.

As a preferable aspect, it is preferable that the end side member is a disk-like member attached to one end of the housing.

As a preferable aspect, it is preferable that the discharge passageway includes a filter which removes foreign matter from the cooling medium.

As a preferable aspect, it is preferable that the discharge passageway is common to the first discharge port and the second discharge port.

According to another aspect of the present invention, there is provided an electric motor comprising the electric motor cooling medium discharge structure.

According to still another aspect of the present invention, there is provided an electric motor which rotationally drives an upper swing body of a construction machine having a shaft attached with a rotor core disposed in a housing, the electric motor comprising: a first discharge port which is provided in an end side member, supporting the shaft through a bearing and disposed at one end of the housing, at the inside in relation to the inner peripheral surface of the housing and through which a cooling medium in the housing passes; a second discharge port through which the cooling medium in the housing passing the bearing provided in the end side member and supported by the end side member passes; and a discharge passageway which extends outward in the radial direction of the shaft and discharges the cooling medium passing the first discharge port and the second discharge port to the outside of the housing, wherein the first discharge port has a larger opening area than an opening area of the second discharge port and a larger dimension in a direction parallel to the radial direction of the shaft than a dimension in a direction perpendicular to the radial direction of the shaft.

Advantageous Effects of Invention

According to the invention, it is possible to decrease the amount of the cooling medium which stays inside the housing of the electric motor and is not discharged to the outside when cooling the electric motor by the cooling medium.

DESCRIPTION OF EMBODIMENTS

Figure 1:
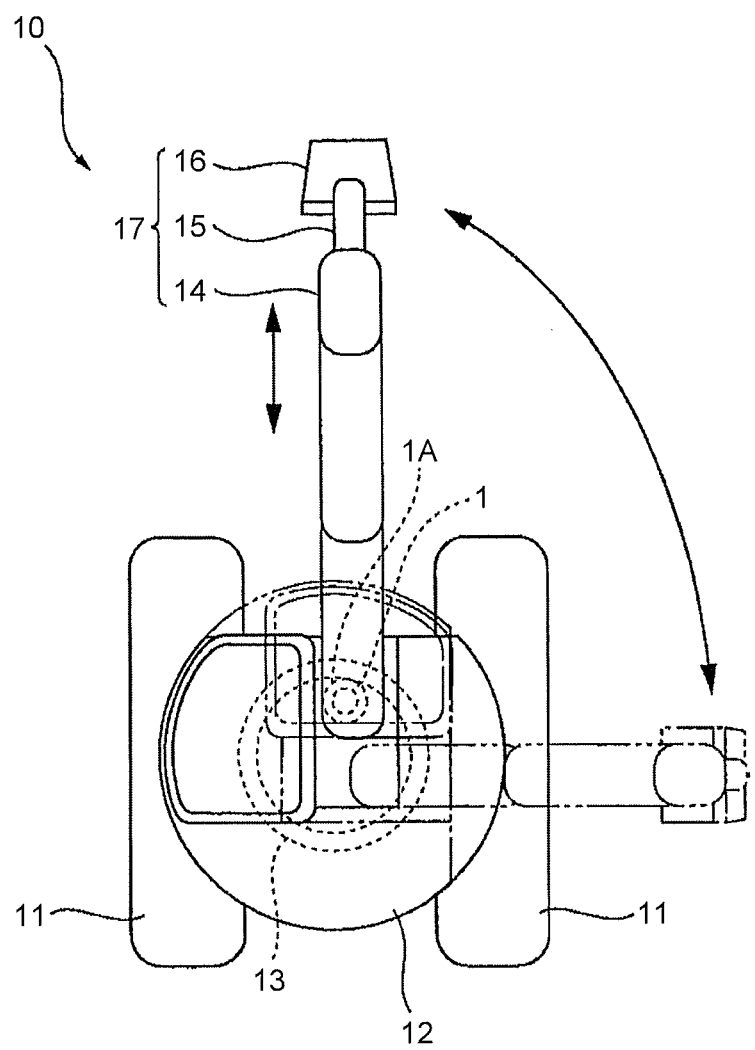
FIG. 1 is a plan view illustrating a hybrid excavator which uses an electric motor according to an embodiment as a swing electric motor.

A mode for carrying out the invention (an embodiment) will be described in detail by referring to the drawings. The invention is not limited to the content to be described below. Further, the constituents to be described below include a constituent that may be easily supposed by the person skilled in the art and a constituent that substantially has the same configuration. Further, the constituents to be described below may be appropriately combined with each other.

<Hybrid Excavator>

FIG. 1 is a plan view illustrating a hybrid excavator which uses an electric motor according to the embodiment as a swing electric motor. A hybrid excavator 10 includes a pair of left and right crawlers 11 which constitutes a lower running body, an upper swing body 12, a swing circle 13 which connects the lower running body to the upper swing body 12, an electric motor 1 which serves as a swing motor, a swing pinion 1A, a boom 14, an arm 15, and a bucket 16, and also includes an operating machine 17 which is attached to the upper swing body 12.

The pair of left and right crawlers 11 are driven by a right running hydraulic motor and a left running hydraulic motor so that the hybrid excavator 10 runs. The upper swing body 12 swings by the electric motor 1 which serves as the swing motor. An outer race of the swing circle 13 is fixed to the upper swing body 12, and an inner race of the swing circle 13 is fixed to the lower running body. With such a structure, the swing circle 13 connects the upper swing body 12 to the lower running body. The electric motor 1 is provided so that the input and output shaft of the electric motor 1 faces the gravity action direction when the electric motor is vertically installed, that is, the hybrid excavator 10 is installed in the horizontal plane. The input and output shaft of the electric motor 1 is connected to the swing pinion 1A through a swing machinery with a speed reduction mechanism. The swing pinion 1A meshes with the internal tooth attached to the inner race of the swing circle 13. The driving force of the electric motor 1 is transmitted to the swing pinion 1A through the swing machinery so that the upper swing body 12 swings. The boom 14, the arm 15, and the bucket 16 are respectively driven by the hydraulic cylinders for the boom 14, the arm 15, and the bucket 16 through a control valve using hydraulic oil which is pressure-fed from a hydraulic pump (not illustrated), whereby an operation such as excavation is performed.

The hybrid excavator 10 drives the generator and the hydraulic pump by an internal combustion engine and drives the electric motor 1 through an inverter (not illustrated) by the power of the generator so as to swing the upper swing body 12. Further, the hybrid excavator 10 generates a braking force necessary when stopping the upper swing body 12 by using the electric motor 1 as the generator and stores electric power generated by the electric motor 1 through the braking force in an electric storage device such as a capacitor or a secondary battery. In this way, the hybrid excavator 10 is a so-called hybrid type construction vehicle. In the embodiment, an example will be described in which the electric motor 1 is used as the swing motor of the hybrid excavator 10 as one kind of the construction vehicle, but the application target of the electric motor 1 is not limited thereto. Furthermore, the hybrid excavator 10 may be of a type which does not include an internal combustion engine, that is, a type which is driven by the electric power of the electric storage device. Next, the electric motor according to the embodiment will be described.

<Electric Motor Cooling Structure>

Figure 2:
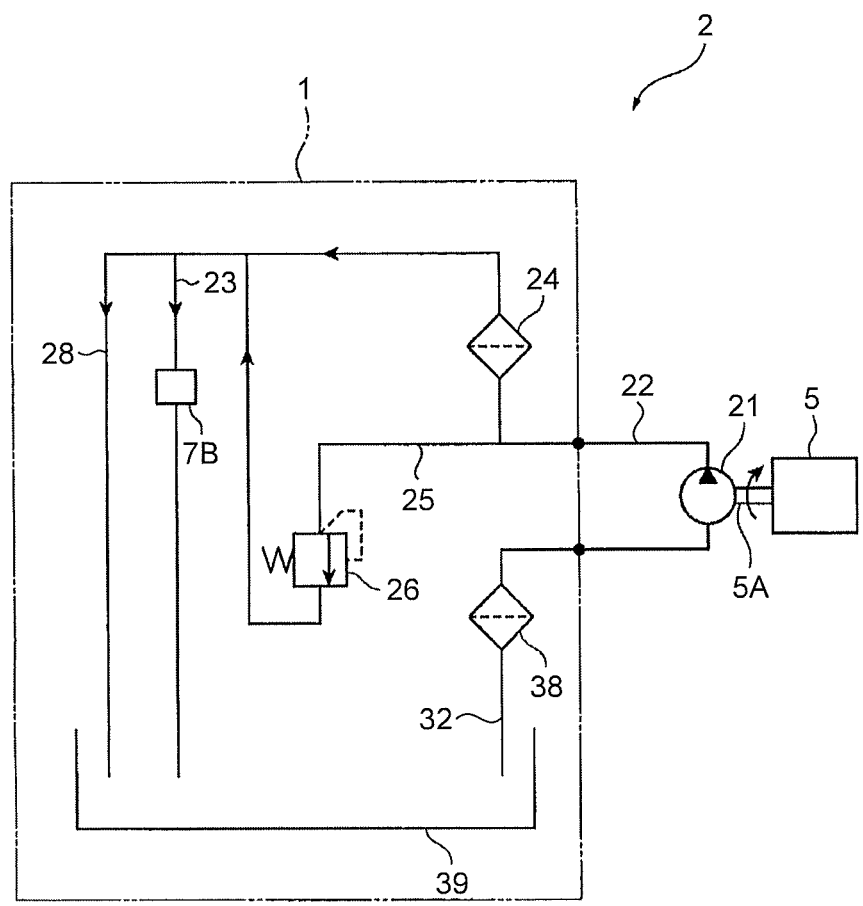
FIG. 2 is a schematic diagram illustrating an electric motor cooling structure according to the embodiment.

FIG. 2 is a schematic diagram illustrating an electric motor cooling structure according to the embodiment. The electric motor 1 is cooled by, for example, a cooling medium such as oil and lubricates a bearing 7B by the cooling medium. A cooling structure 2 of the electric motor 1 includes a pump 21, a pump electric motor 5, a passageway 22, a bearing passageway 23, a rotor passageway 28, an oil accumulation portion 39, a discharge passageway 32, a filter 24, a relief passageway 25, a relief valve 26, and a filter 38. A cooling unit which cools the cooling medium may be provided between the filter 38 and the pump 21. The pump 21 and the pump electric motor 5 are connected to each other by an input and output shaft 5A of the pump electric motor 5. The driving unit of the pump 21 may be a unit other than the pump electric motor 5. For example, the internal combustion engine as the power generating source of the hybrid excavator 10 illustrated in FIG. 1 may be employed. In the embodiment, the filter 24 and the filter 38 are built in the electric motor 1.

When cooling the electric motor 1, the pump electric motor 5 drives the pump 21. Then, the pump 21 suctions the cooling medium from the discharge passageway 32 and discharges the cooling medium to the passageway 22. Foreign matter and the like are removed while the cooling medium passes the filter 24, and the cooling medium flows into the bearing passageway 23 and the rotor passageway 28. The cooling medium, which flows into the bearing passageway 23, cools and lubricates the bearing 7B, and then is accumulated in the discharge passageway 32. The cooling medium which flows into the rotor passageway 28 cools the rotor core and the coil of the electric motor 1, and is accumulated in the discharge passageway 32. Foreign matter is removed from the cooling medium, which is accumulated in the discharge passageway 32, by the filter 38, and the cooling medium is suctioned to the pump 21 again and is discharged to the passageway 22.

The passageway 22 is connected to the discharge port of the pump 21, and is branched to the inlet of the filter 24 and the relief passageway 25 inside the electric motor 1. The passageway which is provided at the outlet of the filter 24 so that the cooling medium passes therethrough is branched to the bearing passageway 23 and the rotor passageway 28. The bearing passageway 23 supplies the cooling medium to the bearing 7B so as to cool and lubricate the bearing. The rotor passageway 28 supplies the cooling medium to the rotor of the electric motor 1 so as to cool the rotor. Furthermore, the cooling structure 2 may not essentially have the bearing passageway 23. The cooling medium which cools the bearing 7B and the rotor passageway 28 is accumulated in the oil accumulation portion 39. The discharge passageway 32 connects the oil accumulation portion 39 to the filter 38. The cooling medium which is accumulated in the oil accumulation portion 39 passes the filter 38 inside the discharge passageway 32. The filter 38 and the inlet of the pump 21 are connected to each other at the passageway through which the cooling medium passes, and the cooling medium which passes the filter 38 is suctioned to the pump 21. The relief passageway 25 which is branched from the passageway 22 is connected to the inlet of the relief valve 26. The outlet of the relief valve 26 is connected to the outlet of the filter 24.

For example, when the filter 24 is blocked so that the cooling medium hardly flows to the filter 24, the pressure of the passageway 22 and the relief passageway 25 increases. When the pressure of the cooling medium in the relief passageway 25 exceeds the valve opening pressure of the relief valve 26, the relief valve 26 is opened. Then, the relief valve 26 bypasses the filter 24 and causes the cooling medium to flow to the bearing passageway 23 and the rotor passageway 28. In the cooling structure 2 with such a configuration, even when the filter 24 is blocked, the relief valve 26 causes the cooling medium to flow to the bearing passageway 23 and the rotor passageway 28, so that the bearing 7B may be cooled and lubricated and the rotor core and the like may be continued to be cooled. Next, the structure of the electric motor 1 will be described.

<Electric Motor>

Figure 3:
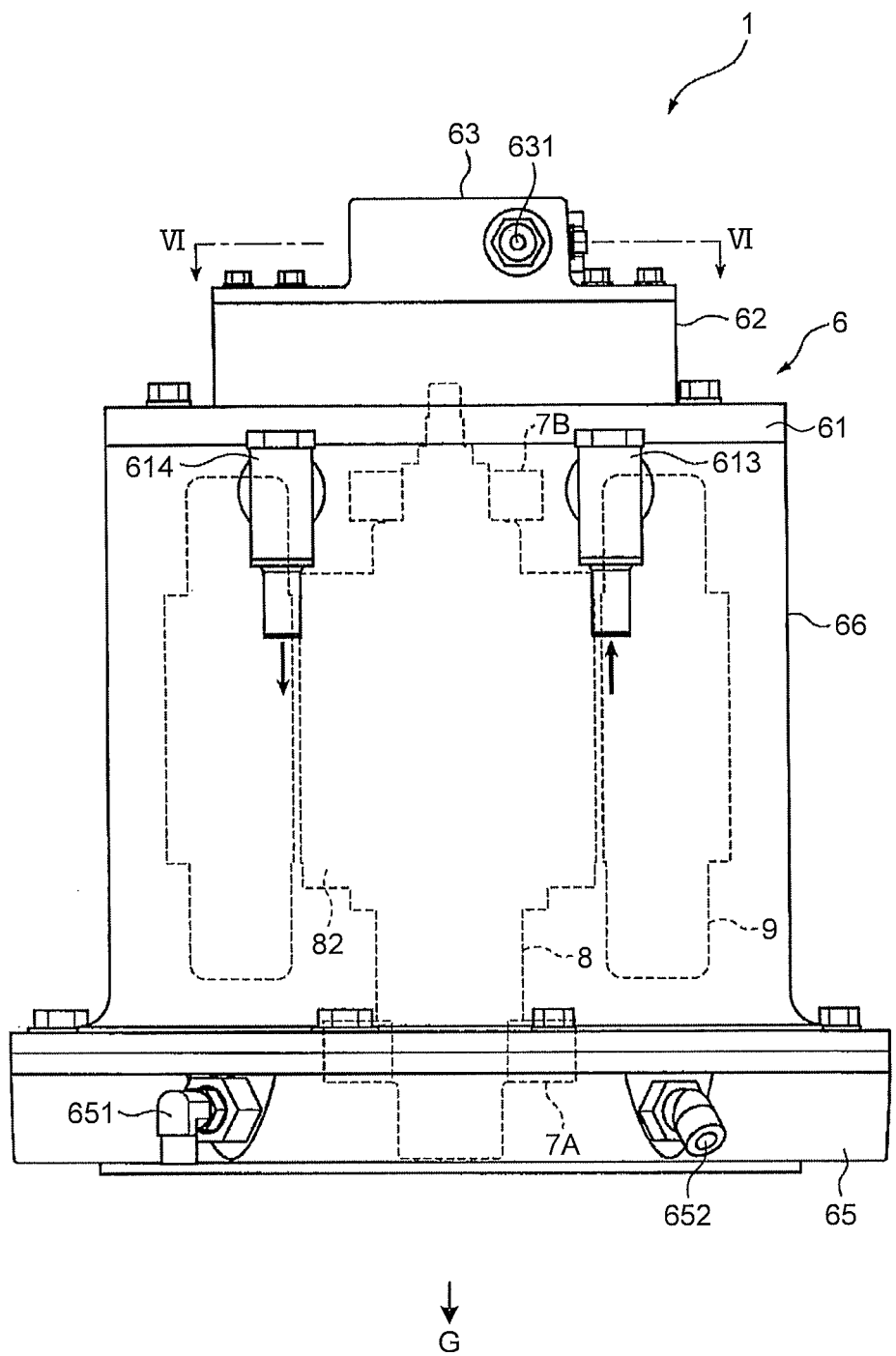
FIG. 3 is a front view illustrating the electric motor according to the embodiment.
Figure 4:
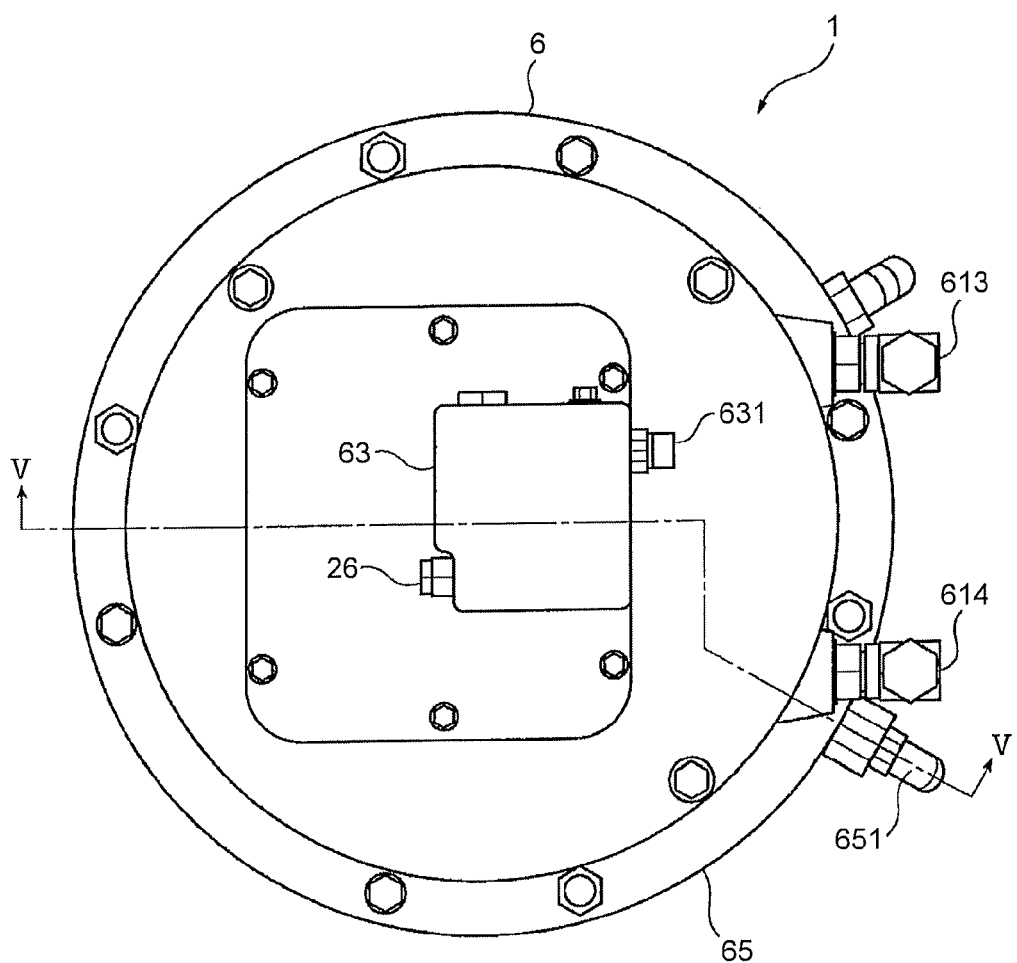
FIG. 4 is a plan view of the electric motor according to the embodiment.
Figure 5:
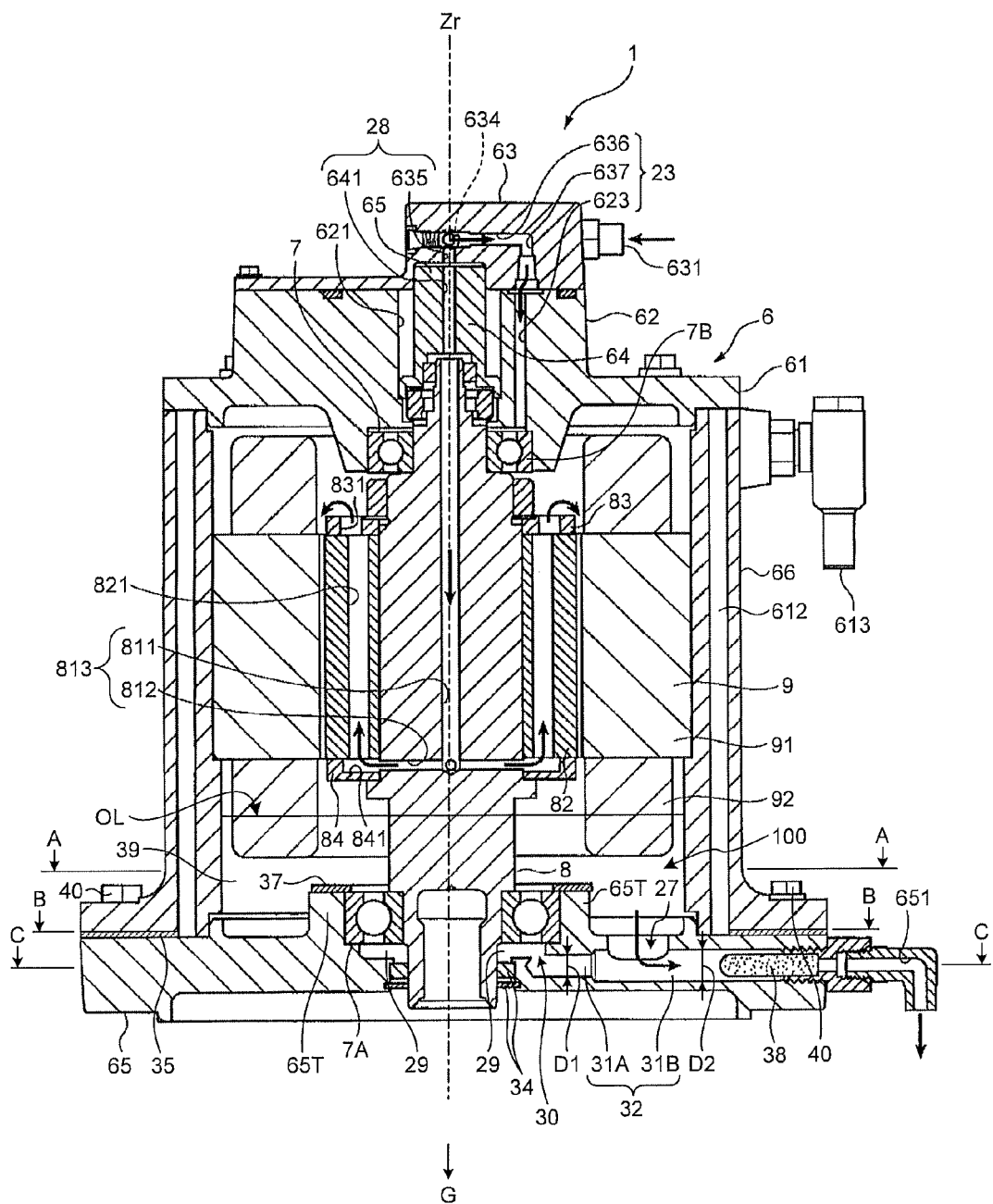
FIG. 5 is a view taken along the line V-V of FIG. 4.
Figure 6:
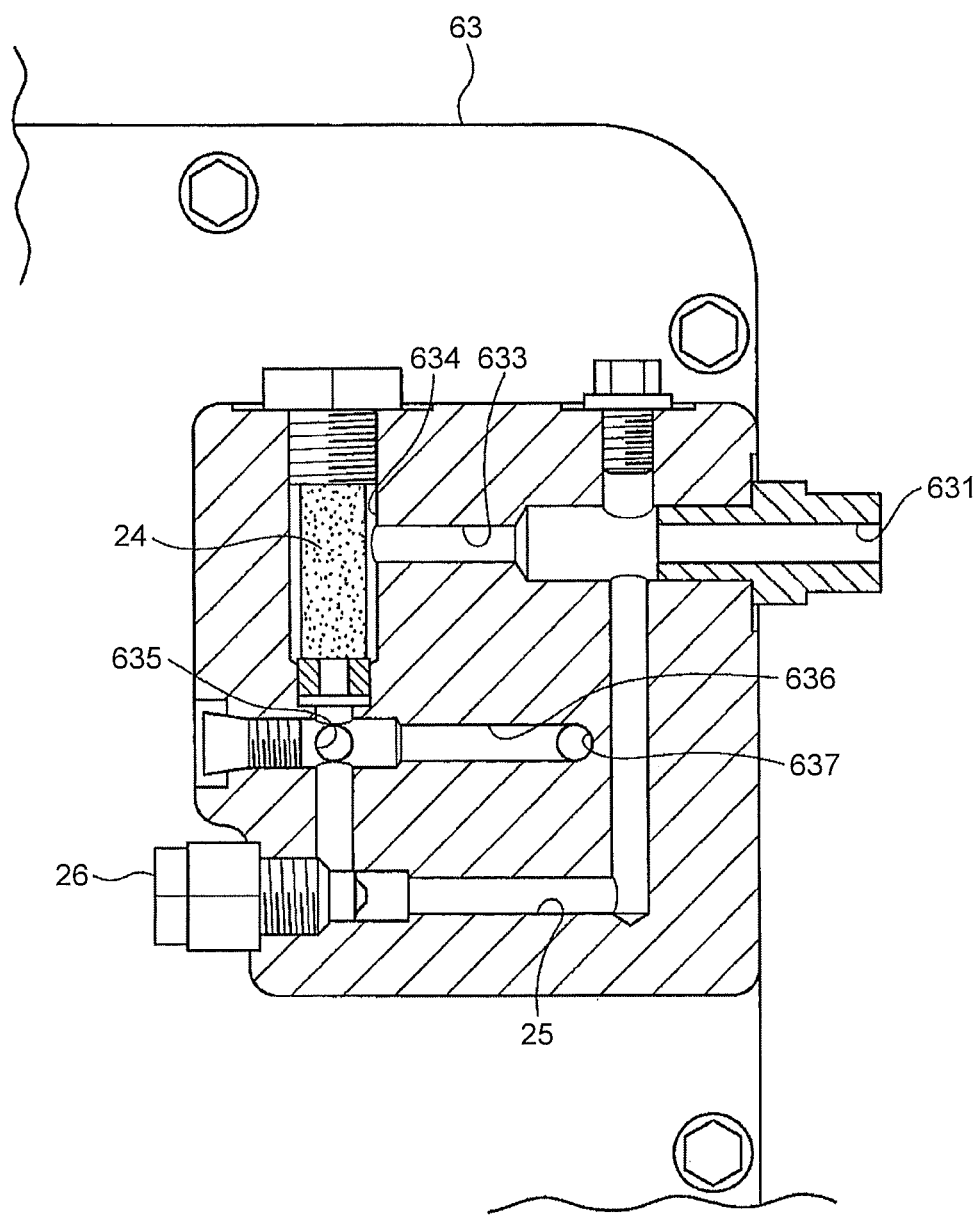
FIG. 6 is a view taken along the line VI-VI of FIG. 3.

FIG. 3 is a front view illustrating the electric motor according to the embodiment. FIG. 4 is a plan view of the electric motor according to the embodiment. FIG. 5 is a view taken along the line V-V of FIG. 4. FIG. 6 is a view taken along the line VI-VI of FIG. 3. As illustrated in FIG. 3, the electric motor 1 includes a shaft 8 which serves as an input and output shaft at the inside of a cylindrical housing 6, a rotor core 82 which is attached to the shaft 8, and a stator 9 which is disposed at the outer periphery of the rotor core 82. That is, the electric motor 1 has a structure in which the shaft 8 equipped with the rotor core 82 is disposed inside the cylindrical housing 6. The bearings 7A and 7B are attached to both sides of the shaft 8, and the shaft is rotatably supported by the housing 6 through the bearings 7A and 7B.

The housing 6 includes a side portion 66 which is a cylindrical member, a first flange 65 which serves as an end side member attached to one end of the side portion 66 (the input and output side end of the shaft 8), and a second flange 61 which is attached to the other end of the side portion 66 and has a disk shape. A space which is surrounded by the side portion 66, the first flange 65, and the second flange 61 becomes the inside of the housing 6. The first flange 65 is disposed at the lower side (which is the gravity action direction side and the direction indicated by the arrow G in FIGS. 3 and 5) while the electric motor 1 is used. For example, when the electric motor 1 is mounted on the hybrid excavator 10 illustrated in FIG. 1, the state where the hybrid excavator 10 is grounded to the horizontal plane indicates a state where the electric motor 1 is used, and the first flange 65 is disposed at the lower side in this state.

The side portion 66 is a member of which the inner peripheral surface is cylindrical. The side portion 66 includes a cooling water introduction port 613 which introduces water cooling the electric motor 1 into a water jacket to be described later and a cooling water discharge port 614 which discharges the cooling water from the water jacket. The water jacket may introduce, for example, a cooling medium such as oil other than water thereinto so as to cool the electric motor 1.

The first flange 65 is a disk-like member. The first flange 65 includes a cooling medium discharge port 651 which discharges the cooling medium from the inside of the housing 6 during the operation of the electric motor 1 and guides the cooling medium to the pump 21 illustrated in FIG. 2. Further, the first flange 65 includes a drain port 652 which extracts the cooling medium in the housing 6 when performing the maintenance and the inspection of the electric motor 1. The first flange 65 as the end side member is disposed at one end of the housing 6 and the shaft 8 passes therethrough. A power transmission joint, a decelerator input shaft, or the like is attached to the shaft 8 which penetrates from the first flange 65. In the embodiment, the first flange 65 is a member separate from the side portion 66, but the first flange 65 and the side portion 66 may be made as the same member.

The second flange 61 is disposed at the upper side, that is, the opposite side to the gravity action direction while the electric motor 1 is used. The second flange 61 includes a convex portion 62, a cooling medium distribution portion 63, and a cooling medium inlet 631. The cooling medium inlet 631 is used to introduce the cooling medium discharged from the pump 21 illustrated in FIG. 1 into the housing 6. The cooling medium inlet 631 is connected to the cooling medium distribution portion 63. Next, the internal structure of the electric motor 1 will be described.

<Electric Motor Internal Structure>

As illustrated in FIG. 5, the bearing 7A which is attached to the shaft 8 is attached to the first flange 65, and the bearing 7B is attached to the second flange 61. The bearing 7A is disposed at the side of the first flange 65, that is, the input and output side of the shaft 8 of the electric motor 1. The shaft 8 is rotatably supported by the housing 6 by two bearings 7A and 7B provided at both sides, and rotates about the rotation center axis Zr. The rotation center axis Zr is the center axis of the shaft 8.

The rotor core 82 which is attached to the outer periphery of the shaft 8 has a structure in which a plurality of steel plates (magnetic steel plates) is stacked. The rotor core 82 is sandwiched by balance plates 83 and 84 from both sides of the direction (the stacking direction) in which the steel plates are stacked. The balance plates 83 and 84 are attached to the shaft 8 so that the plurality of steel plates constituting the rotor core 82 is not separated from each other, and hence a pressure is applied to the plurality of steel plates. The balance plate 84 near the first flange 65 is disposed at the side of the first flange 65, that is, the input and output side of the shaft 8 of the electric motor 1. The stator 9 is disposed at the outer periphery of the rotor core 82. The stator 9 is attached to the inner periphery of the side portion 66 of the housing 6. The stator 9 is a structure in which a coil 92 is wound around a stator core 91. The protruding portion of the coil 92 from the stator core 91 is a coil end. The stator core 91 is a structure in which a plurality of steel plates (magnetic steel plates) is stacked.

The shaft 8 includes an axial passageway 811 which extends along the center axis and a plurality of radial passageways 812 which extend outward in the radial direction of the shaft 8 from the axial passageway 811 and are opened to the surface of the shaft 8. The axial passageway 811 and the radial passageways 812 become a shaft inside cooling medium passageway 813. The balance plate 84 includes a concave portion 841 at the side contacting the rotor core 82. The rotor core 82 includes a rotor core penetration hole 821 which penetrates the rotor core 82 in the direction in which the plurality of steel plates are stacked, that is, the center axial direction of the shaft 8. Further, the rotor core 82 includes a plurality of permanent magnets (not illustrated). The balance plate 83 near the second flange 61 includes a balance plate penetration hole 831 which faces the center axial direction of the shaft 8. The shaft inside cooling medium passageway 813, the concave portion 841, the rotor core penetration hole 821, and the balance plate penetration hole 831 respectively communicate with each other so as to form a passageway through which the cooling medium passes. These are provided in the shaft 8 and the rotor core 82 as rotation bodies, and become a rotation side cooling medium passageway through which the cooling medium passes.

The convex portion 62 of the second flange 61 includes a penetration hole 621. The penetration hole 621 includes a connection member 64 which supplies the cooling medium from a stationary system to the shaft 8 as a rotation system. The connection member 64 includes a cooling medium introduction passageway 641 which penetrates therethrough. The cooling medium introduction passageway 641 faces the opening of the axial passageway 811 of the shaft 8, and introduces the cooling medium to the axial passageway 811. The convex portion 62 includes a bearing side passageway 623 which supplies the cooling medium to the bearing 7B. The bearing 7B receives the cooling medium from the bearing side passageway 623.

As illustrated in FIG. 6, the cooling medium distribution portion 63 which is attached to the convex portion 62 includes a first cooling medium distributing passageway 633, a second cooling medium distributing passageway 635, a third cooling medium distributing passageway 636, and a fourth cooling medium distributing passageway 637 which distribute the cooling medium from the cooling medium inlet 631. Further, the cooling medium distribution portion 63 includes a filter accommodation portion 634 which accommodates the filter 24, the relief passageway 25, and the relief valve 26. The cooling medium inlet 631 is connected to the filter accommodation portion 634 through the first cooling medium distributing passageway 633.

The second cooling medium distributing passageway 635 is connected to the filter accommodation portion 634, and introduces a part of the cooling medium passing the filter 24 into the cooling medium introduction passageway 641 of the connection member 64. The second cooling medium distributing passageway 635 and the cooling medium introduction passageway 641 correspond to the rotor passageways 28 illustrated in FIGS. 2 and 5. The third cooling medium distributing passageway 636 is connected to the filter accommodation portion 634, and introduces the rest of the cooling medium introduced into the cooling medium introduction passageway 641 through the filter 24 into the fourth cooling medium distributing passageway 637. The third cooling medium distributing passageway 636, the fourth cooling medium distributing passageway 637, and the bearing side passageway 623 correspond to the bearing passageway 23 illustrated in FIGS. 2 and 5.

The relief passageway 25 connects the cooling medium inlet 631 to the relief valve 26. The relief valve 26 is interposed between the relief passageway 25, the second cooling medium distributing passageway 635, and the third cooling medium distributing passageway 636 so as to bypass the filter 24. When the pressure of the cooling medium in the relief passageway 25 exceeds the valve opening pressure of the relief valve 26, the relief valve 26 is opened, so that the cooling medium from the cooling medium inlet 631 flows to the second cooling medium distributing passageway 635 and the third cooling medium distributing passageway 636 by bypassing the filter 24. The valve opening pressure of the relief valve 26 may be set to, for example, the pressure inside the relief passageway 25 when the filter 24 needs to be replaced due to the blocking thereof. With such a configuration, it is possible to reliably supply the cooling medium to the bearing 7B, the rotor core 82, and the like even when the filter 24 needs to be replaced due to the blocking thereof. Further, when the valve opening pressure of the relief valve 26 is set as described above and a valve opening state informing unit for the relief valve 26 is provided, it is possible to inform the replacement timing of the filter 24 due to the opening of the relief valve 26.

Since the bearing passageway 23 is provided in the convex portion 62, that is, the stationary system, the supply of the cooling medium is not influenced by the rotation of the rotor core 82. For this reason, it is possible to suppress a change in the cooling medium with the rotation of the rotor core 82 compared to the case where an oil passageway is formed from the shaft 8 to the bearing 7B. As a result, it is possible to supply an appropriate amount of the cooling medium to the bearing 7B.

<Cooling of Electric Motor>

A part of the cooling medium, which is supplied from the cooling medium inlet 631 of the cooling medium distribution portion 63 and passes the filter 24, flows into the axial passageway 811 of the shaft inside cooling medium passageway 813 through the rotor passageway 28. The cooling medium passes the radial passageway 812 and flows into the rotor core penetration hole 821 through the concave portion 841 of the balance plate 84. The cooling medium cools the rotor core 82 and the permanent magnet (not illustrated) while passing the rotor core penetration hole 821, and flows out of the balance plate penetration hole 831 of the balance plate 83. When the rotor core 82 rotates, the cooling medium which flows out of the balance plate penetration hole 831 is supplied to the coil end of the stator 9 (the portion in which the coil 92 protrudes from the stator core 91) by the centrifugal force. The cooling medium cools the stator 9 while flowing downward inside the housing 6, and is accumulated in a first discharge port 27 which is provided inside the housing 6 of the first flange 65. A reference sign OL of FIG. 5 indicates a liquid level of the cooling medium which is accumulated in the oil accumulation portion 39. In this way, in the amount of the cooling medium which is accumulated in the oil accumulation portion 39, as illustrated in FIG. 5, the amount of the cooling medium discharged from the cooling medium discharge port 651 is adjusted so that a part of the coil end protruding toward the first flange is normally submerged, whereby the coil end is cooled.

In the cooling medium which is supplied from the cooling medium inlet 631 of the cooling medium distribution portion 63 and passes the filter 24, the cooling medium which does not flow into the rotor passageway 28 flows into the bearing passageway 23 and is supplied to the bearing 7B. The cooling medium cools and lubricates the bearing 7B, and flows downward inside the housing 6. During this process, the cooling medium contacts and cools the rotor core 82 and the permanent magnet (not illustrated). A part of the cooling medium which contacts the rotor core 82 is supplied to the stator 9 at the outside in the radial direction of the rotor core 82 by the centrifugal force so as to cool the stator. The cooling medium which cools the stator 9 flows downward inside the housing 6, and is accumulated in the oil accumulation portion 39 which is provided inside the housing 6 of the first flange 65. The cooling medium which is accumulated in the oil accumulation portion 39 passes a space between the inner and outer races of the bearing 7A and the rolling element, and flows into a second discharge port 30 to be described later. As a result, the cooling medium which is accumulated in the oil accumulation portion 39 cools and lubricates the bearing 7A.

In this way, the cooling medium cools the rotor core 82 and the stator 9 and cools and lubricates the bearings 7A and 7B. In addition, as described above, the cooling water is supplied from the cooling water introduction port 613 to a water jacket 612 provided in the side portion 66 of the housing 6. The cooling water mainly cools the stator 9 through the housing 6. A gasket 35 which serves as a sealing member for sealing the water jacket 612 is provided between the first flange 65 and the side portion 66. The gasket 35 also serves as an oil seal which prevents a problem in which the cooling medium flows into the housing 6 from the gap between the side portion 66 and the first flange 65 and is mixed with the substance inside the water jacket 612 or flows to the outside of the housing 6. Next, the structure which discharges the cooling medium accumulated in the oil accumulation portion 39 to the outside of the housing 6, that is, the electric motor cooling medium discharge structure according to the embodiment will be described.

<Electric Motor Cooling Medium Discharge Structure>

Figure 7:
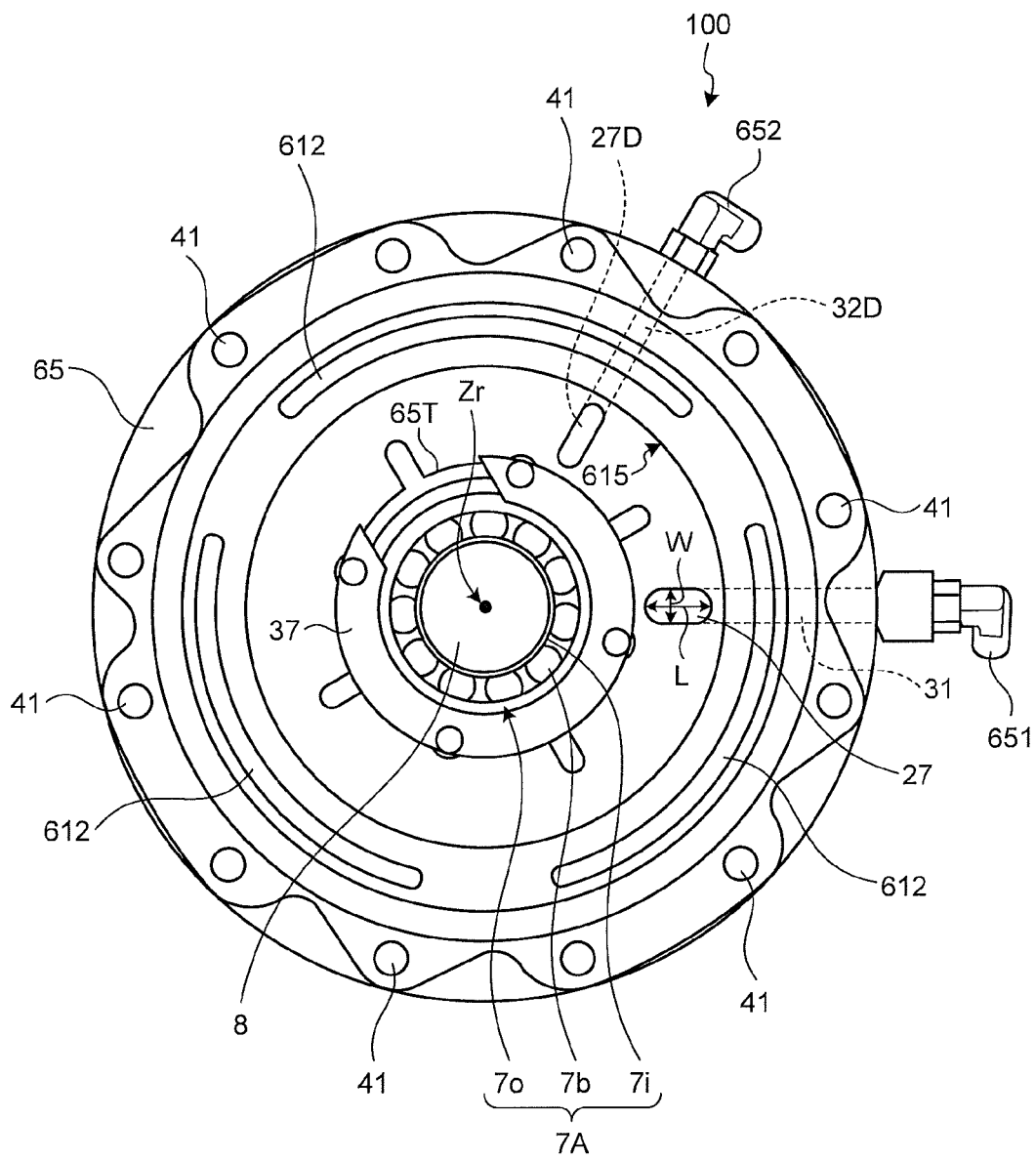
FIG. 7 is a view taken along the line A-A of FIG. 5.
Figure 8:
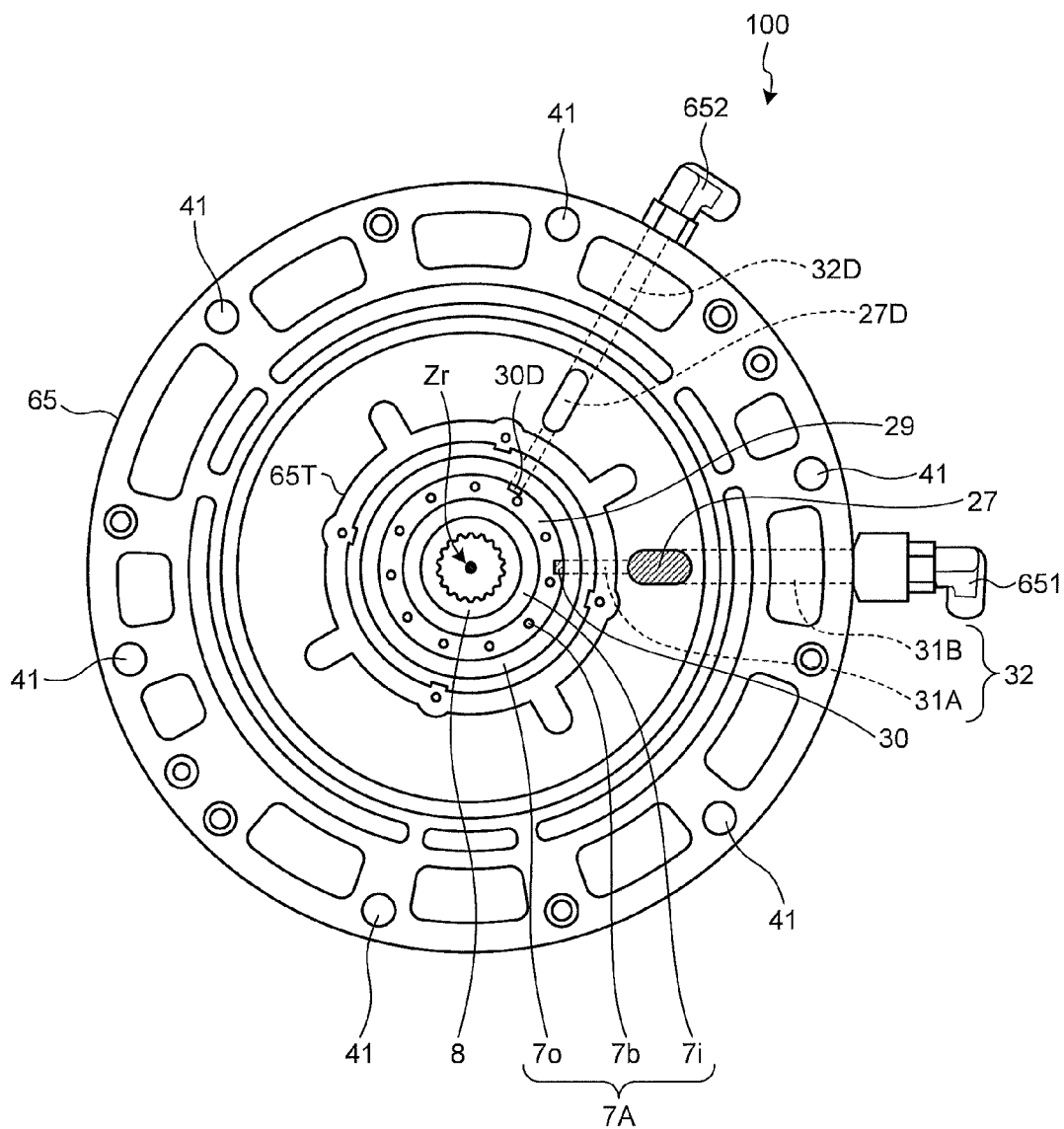
FIG. 8 is a view taken along the line B-B of FIG. 5.
Figure 9:
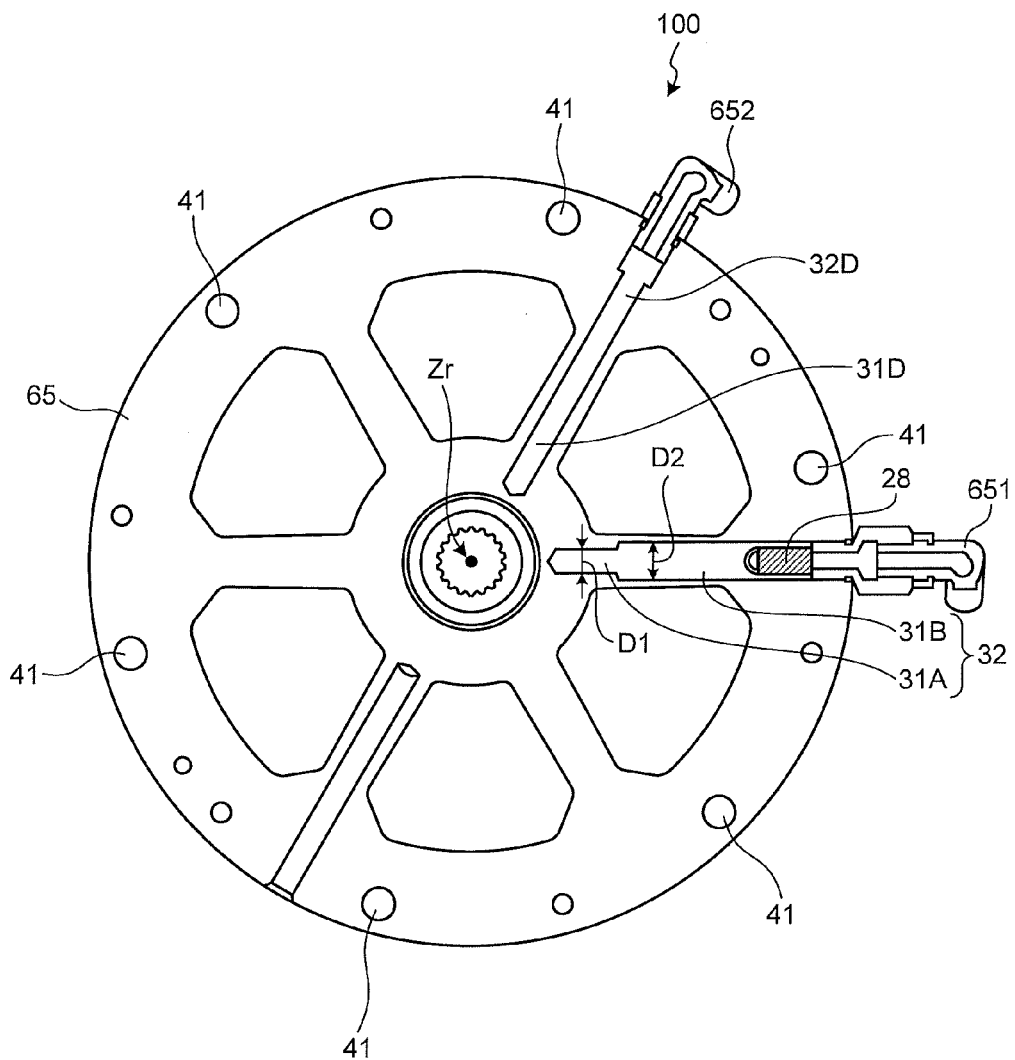
FIG. 9 is a view taken along the line C-C of FIG. 5.
Figure 10:
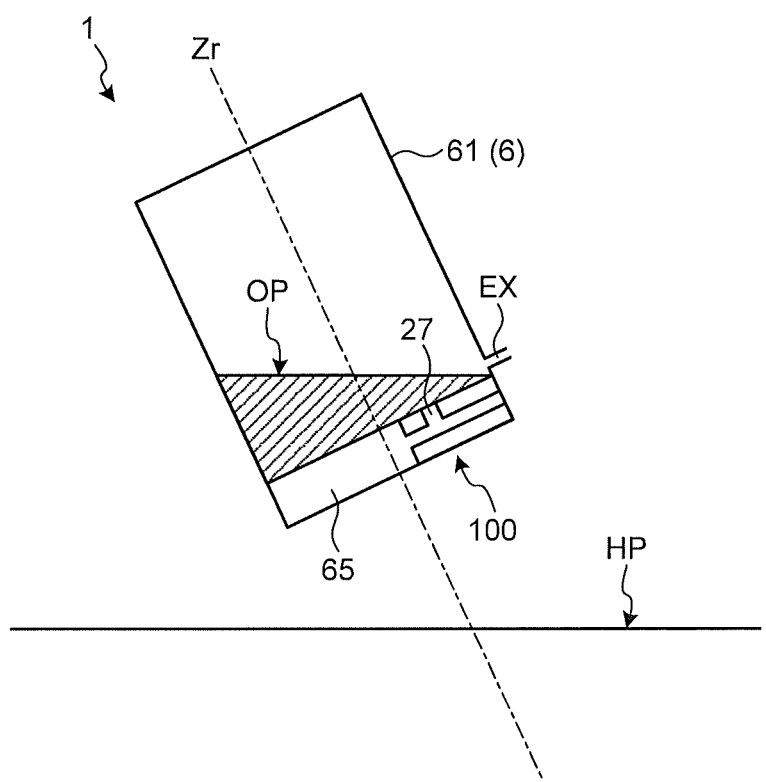
FIG. 10 is a conceptual diagram illustrating a liquid level state of a cooling medium in a state where the electric motor is inclined with respect to the horizontal plane.

FIG. 7 is a view taken along the line A-A of FIG. 5. FIG. 8 is a view taken along the line B-B of FIG. 5. FIG. 9 is a view taken along the line C-C of FIG. 5. FIG. 10 is a conceptual diagram illustrating a liquid level state of the cooling medium in a state where the electric motor is inclined with respect to the horizontal plane. The electric motor cooling medium discharge structure (hereinafter, referred to as a discharge structure if necessary) 100 includes the first discharge port 27, the second discharge port 30, and the discharge passageway 32.

The first flange 65 is a disk-like structure. The first flange 65 includes a circular-arc convex portion 65T which protrudes from one surface. A step which supports the bearing 7A is formed at the inside of the convex portion 65T in the radial direction. The bearing 7A is received in the step and is fixed to the first flange 65 by a C-ring (the C-shaped plate member) 37. The first discharge port 27 is provided at the outside of the convex portion 65T in the radial direction. The first discharge port 27 is a portion which is opened to a position (one surface of the first flange 65) lower than the apex (the portion in which the C-ring 37 contacts the convex portion 65T) of the convex portion 65T. The second discharge port 30 is a portion which is provided at the inside of the convex portion 65T in the radial direction and from which the cooling medium passing the bearing 7A from the inside of the housing 6 of the electric motor 1, and more specifically, the oil accumulation portion 39 flows to the discharge passageway 32.

In this way, the first discharge port 27 is disposed at one end of the housing 6 and is provided at the end side member (in the embodiment, the first flange 65) through which the shaft passes so that the cooling medium passes therethrough. The first discharge port 27 is a portion which is opened to the oil accumulation portion 39 of the housing 6 and, in the embodiment, the first flange 65 as the end side member so that the cooling medium in the housing 6 passes the discharge passageway 32. The second discharge port 30 is provided in the end side member (in the embodiment, the first flange 65) so that the cooling medium of the oil accumulation portion 39 passing the bearing 7A, that is, the cooling medium in the housing 6 passes therethrough. The discharge passageway 32 discharges the cooling medium which passes the first discharge port 27 and the second discharge port 30 to the outside of the housing 6.

In the embodiment, a space (bearing outside space) 29 from which the cooling medium in the housing 6 flows out of the bearing 7A is provided at the inside of the convex portion 65T of the first flange 65 in the radial direction. Here, a seal 34 which prevents the cooling medium from flowing out of the gap between the first flange 65 and the shaft 8 is provided at the lower side of the bearing 7A (which is one end side of the shaft 8 and the side where the shaft 8 protrudes from the first flange 65 in this example). The seal 34 is interposed between the first flange 65 and the shaft 8 so as to suppress the leakage of the cooling medium. In the embodiment, the bearing outside space 29 is a space which is surrounded by the first flange 65, the bearing 7A, and the seal 34. The second discharge port 30 is a portion in which the discharge passageway 32 is opened to the bearing outside space 29. The bearing outside space 29 is disposed at one end side of the shaft 8 in relation to the portion where the cooling medium flows from the bearing 7A.

The second discharge port 30 is a portion through which the cooling medium in the housing 6 (more specifically, the oil accumulation portion 39 of the housing 6) passing the bearing 7A passes the discharge passageway 32. Furthermore, the electric motor 1 may not essentially include the bearing outside space 29. In this case, the second discharge port 30 is a portion which is provided between the bearing 7A and the discharge passageway 32 and through which the cooling medium in the housing 6 passing the bearing 7A passes the discharge passageway 32.

In the embodiment, the discharge passageway 32 includes a first discharge passageway 31A and a second discharge passageway 31B. The first discharge passageway 31A is a passageway which is connected to the second discharge port 30 and a portion which is connected from the second discharge port 30 to the first discharge port 27. The second discharge passageway 31B is a passageway which is connected to the first discharge port 27 and a portion which is positioned at the downstream side in the cooling medium flowing direction in relation to the first discharge port 27.

As illustrated in FIGS. 5, 7, and 8, the first discharge port 27 is opened to the housing 6 of the first flange 65. In FIG. 8, the first discharge port 27 is a hatching portion. The first discharge port 27 communicates with the discharge passageway 32, and the cooling medium which passes the first discharge port 27 flows into the discharge passageway 32. The discharge passageway 32 is connected to the cooling medium discharge port 651. The cooling medium which passes the discharge passageway 32 passes the cooling medium discharge port 651, is suctioned into the pump 21 illustrated in FIG. 2, is discharged to the passageway 22 illustrated in FIG. 2, and is returned into the housing 6 again so as to cool the rotor core 82, the stator 9, and the like. In the embodiment, the first flange 65 also includes a drain discharge port 27D which is connected to the drain port 652 through a drain passageway 32D, but the drain discharge port 27D and the drain passageway 32D have the same structures as the first discharge port 27 and the discharge passageway 32. Furthermore, in the embodiment, the drain discharge port 27D and the drain passageway 32D are provided separately from the first discharge port 27 and the discharge passageway 32, but the drain discharge port 27D and the drain passageway 32D may not be provided. In this case, the drain port 652 illustrated in FIG. 3 is also not needed. When the drain discharge port 27D, the drain passageway 32D, and the drain port 652 are not provided, a drain branch passageway (branch pipe) is provided in the passageway (pipe) in the mounting subject (for example, the construction vehicle) of the electric motor 1 connected to the cooling medium discharge port 651. Then, the draining operation is performed by using the first discharge port 27, the discharge passageway 32, and the branch passageway. With such a configuration, since the drain discharge port 27D and the drain passageway 32D may not be provided in the first flange 65, it is possible to reduce the processing effort and to suppress degradation in the strength of the first flange 65.

As illustrated in FIGS. 5 and 8, the second discharge port 30 is a portion through which the cooling medium flowing out of the bearing 7A flows to the discharge passageway 32 (more specifically, the first discharge passageway 31A). FIG. 8 illustrates a cross-section B-B of FIG. 5, and in this cross-section, a part of an outer race 7o and a ball (rolling element) 7b and an inner race 7i of the bearing 7A are illustrated. The bearing outside space 29 is illustrated between the balls 7b. Further, the second discharge port 30 is opened to the bearing outside space 29. The cooling medium, which passes the second discharge port 30, flows into the discharge passageway 32 (more specifically, the first discharge passageway 31A).

The cooling medium which flows into the discharge passageway 32 passes the cooling medium discharge port 651, is suctioned into the pump 21 illustrated in FIG. 2, is discharged to the passageway 22 illustrated in FIG. 2, and is returned into the housing 6 again so as to cool the rotor core 82, the stator 9, and the like. In the embodiment, the passageway cross-sectional area of the first discharge passageway 31A may be equal to or different from the passageway cross-sectional area of the second discharge passageway 31B. In the embodiment, as illustrated in FIG. 8, the drain passageway 32D is connected to a second drain discharge port 30D. When extracting the cooling medium from the inside of the housing 6, the cooling medium which passes the second drain discharge port 30D flows into the drain passageway 32D.

In the embodiment, the discharge passageway 32 is common to the first discharge port 27 and the second discharge port 30. When the first discharge port 27 and the second discharge port 30 respectively have separate discharge passageways, the processing of the first flange 65 increases. However, when the first discharge port 27 and the second discharge port 30 share the discharge passageway 32, the processing may be decreased. Further, since the number of the discharge passageways may be decreased by sharing the discharge passageway 32, degradation in the strength of the first flange 65 may be suppressed. Further, when the first discharge port 27 and the second discharge port 30 respectively have separate discharge passageways, the respective discharge ports need to be provided on the side surface of the first flange 65, and hence the number of pipes increases. Since the vehicle needs to ensure a space through which the pipe passes, it is preferable to decrease the number of pipes. Since the discharge ports provided on the side surface of the first flange 65 may be integrated by sharing the discharge passageway 32 in the first discharge port 27 and the second discharge port 30, it is preferable in that the number of pipes may be decreased. Furthermore, the first discharge port 27 and the second discharge port 30 may have separate discharge passageways.

The discharge structure 100 discharges the cooling medium in the housing 6 through the discharge passageway 32 from the inner surface of the housing 6 of the first flange 65, that is, the first discharge port 27 provided at the lower side inside the housing 6. For this reason, since the discharge structure 100 may guide the cooling medium to the first discharge port 27 using the action of gravity, it is possible to reduce the cooling medium which stays inside the housing 6 and is not discharged to the outside. As a result, the discharge structure 100 may suppress the cooling medium staying inside the housing 6 as minimum as possible and reliably discharge the cooling medium in the housing 6 to the outside. Further, the discharge structure 100 discharges the cooling medium which passes the bearing 7A from the second discharge port 30 and flows into the bearing outside space 29 from the discharge passageway 32. For this reason, it is possible to reliably discharge the cooling medium accumulated in the bearing outside space 29.

Varnish coated on the coil 92 of the stator 9, cut waste such as metal dust from the sliding portion of the electric motor 1, and abraded powders of the bearings 7A and 7B may be easily accumulated as foreign matter in the bearing outside space 29. In particular, since a part of the coil 92 of the electric motor 1 is immersed into the cooling medium, the foreign matter may be easily accumulated in the bearing outside space 29. The discharge structure 100 connects the second discharge port 30 to the discharge passageway 32 so as to discharge the cooling medium of the second discharge port 30 from the discharge passageway 32 to the outside of the housing 6. For this reason, since the foreign matter in the bearing outside space 29 is discharged along with the cooling medium, the foreign matter which is accumulated in the bearing outside space 29 may be minimized. The cooling medium in the bearing outside space 29 contacts the seal 34, but since the amount of the foreign matter in the bearing outside space 29 is minimized, degradation in the durability of the seal 34 is suppressed. Further, since there is substantially no concern that the foreign matter mixed with the cooling medium in the bearing outside space 29 may intruded into the bearing 7A, it is possible to effectively suppress degradation in the durability of the bearing 7A caused by the biting of the foreign matter, the flaw of the foreign matter, or the chipping of the foreign matter. Further, since the amount of the foreign matter passing the bearing 7A may be decreased by decreasing the oil amount in the bearing 7A, it is possible to suppress degradation in the durability of the seal 34 and the bearing 7A. Further, as described later, since the opening area of the first discharge port 27 is larger than the opening area of the second discharge port 30, a large amount of the cooling medium passes the first discharge port 27. For this reason, the second discharge port 30 may prevent the passage of the cooling medium at the flow rate exceeding the amount necessary for lubricating and cooling the bearing 7A. As a result, the cooling structure 2 may further effectively suppress degradation in durability of the seal 34 and the bearing 7A.

Further, even when the foreign matter enters the bearing outside space 29 through the bearing 7A, the foreign matter inside the bearing outside space 29 is reliably discharged to the outside along with the cooling medium as described above. For this reason, there is no need to provide the seal in the bearing 7A in order to prevent the intrusion of the foreign matter from the bearing 7A. As a result, it is possible to decrease cost and to decrease the sliding resistance caused by the seal. Further, when the seal is not provided in the bearing 7A, the cooling medium passes the bearing 7A during the operation of the electric motor 1, but the cooling medium flows in the bearing 7A, and more specifically, between the outer race 7o, the inner race 7i, and the ball 7b. By this action, there is an effect that the surfaces of the outer race 7o, the inner race 7i, and the ball 7b are cleaned. Since the cleaning makes it possible to remove the foreign matter attached to the surfaces of the outer race 7o, the inner race 7i, and the ball 7b, the discharge structure 100 may effectively suppress degradation in the durability of the bearing 7A.

In the conventional technique, the cooling medium which is accumulated in the bearing may not be substantially discharged to the outside, and hence there is a concern that the bearing may be bitten or scratched by the foreign matter which exists in the cooling medium. Since the discharge structure 100 may discharge the cooling medium in the bearing 7A and the bearing outside space 29 along with the foreign matter as described above, it is possible to decrease the concern that the bearing may be bitten or scratched by the foreign matter which exists in the cooling medium. Further, even in the electric motor which does not have the oil accumulation portion 39, the bearing in the vertical direction (the bearing corresponding to the bearing 7A of the electric motor 1) is cooled and lubricated by the cooling medium which flows down from the upper side, that is, the upper side in the vertical direction. For this reason, the electric motor without the oil accumulation portion 39 may not easily discharge the cooling medium accumulated in the bearing and the bearing outside space 29. In the embodiment, the discharge structure 100 is applied to the electric motor 1 which has the oil accumulation portion 39 in the housing 6, but may be also applied to the electric motor without the oil accumulation portion 39. Even in this case, since the discharge structure 100 may discharge the cooling medium in the bearing and the bearing outside space 29 at the lower side along with the foreign matter, it is possible to decrease the concern that the bearing may be bitten or scratched by the foreign matter which exists in the cooling medium.

As illustrated in FIGS. 5 and 7, the side portion 66 of the housing 6 has the water jacket 612, but since the discharge structure 100 provides the discharge passageway 32 in the first flange 65, there is a low limitation in the space provided with the discharge passageway 32 by the water jacket 612. Further, when the first flange 65 is provided with the discharge passageway 32, the thickness of the first flange 65 slightly increases, but the length of the side portion 66 of the housing 6 may be decreased by the increased thickness. For this reason, an increase in the dimension of the electric motor 1 is suppressed.

When the opening area of the first discharge port 27 is denoted by SA and the opening area of the second discharge port 30 is denoted by SC, SC<SA is preferable. With such a configuration, the pressure loss of the second discharge port 30 becomes larger than that of the first discharge port 27. As a result, the flow rate of the cooling medium which passes the first discharge port 27 becomes larger than the flow rate of the cooling medium which passes the second discharge port 30. In this way, it is possible to decrease the resistance generated when suctioning the cooling medium from the discharge passageway 32 by setting the flow rate of the cooling medium passing the first discharge port 27 to be larger than that of the second discharge port 30. As a result, since it is possible to decrease the load of the pump 21 illustrated in FIG. 2, it is possible to suppress the consumption of energy of the pump 21. Further, the flow rate of the cooling medium passing the second discharge port 30 is smaller than that of the first discharge port 27, but when the cooling medium also passes the second discharge port 30, it is possible to promote the lubricating, the cooling, and the cleaning of the bearing 7A. Furthermore, it is preferable that the opening area SC of the second discharge port 30 be set to a size in which the flow rate of the cooling medium passing the second discharge port 30 has a minimum flow rate necessary for lubricating and cooling the bearing 7A.

Further, the inner diameter of the first discharge passageway 31A is denoted by D1, the inner diameter of the second discharge passageway 31B is denoted by D2, and the passageway cross-section (the cross-section perpendicular to the extension direction of the first discharge passageway 31A and the second discharge passageway 31B) is set as a circle. At this time, the passageway cross-sectional area S1 of the first discharge passageway 31A is $D1^2 \times \pi/4$ and the passageway cross-sectional area S2 of the second discharge passageway 31B is $D2^2 \times \pi/4$. By the inequation of S2>S1, the flow rate of the cooling medium which flows in the second discharge passageway 31B becomes larger than the flow rate of the cooling medium which flows in the first discharge passageway 31A. As a result, the flow rate of the cooling medium which flows in the first discharge port 27 becomes larger than the flow rate of the cooling medium which flows in the second discharge port 30. The ratio S2/S1 is preferably a value in which the flow rate of the cooling medium which passes the second discharge port 30 has a minimum flow rate necessary for lubricating the bearing 7A. In this way, in the embodiment, the discharge structure 100 may adjust the passageway cross-sectional area of the discharge passageway 32 so that the flow rate of the cooling medium passing the first discharge port 27 becomes larger than the flow rate of the cooling medium passing the second discharge port 30. Furthermore, in the embodiment, the flow rate of the cooling medium which passes the first discharge port 27 and the second discharge port 30 may be adjusted by adjusting both the passageway cross-sectional area of the discharge passageway 32 and the opening areas of the first discharge port 27 and the second discharge port 30.

In the construction vehicle such as the hybrid excavator, a high load acts on the driving system in a general case. For example, when the electric motor 1 is used as the swing motor of the hybrid excavator, the hybrid excavator frequently swings and stops the upper swing body, and hence a high load continuously acts on the electric motor 1. For this reason, since the amount of heat generated by the electric motor 1 increases, a sufficient cooling operation is needed. Accordingly, the flow rate of the cooling medium which is supplied into the housing 6 of the electric motor 1 and is discharged to the outside (the flow rate of the cooling medium which circulates between the electric motor 1 and the pump) increases. As described above, the pressure loss in the second discharge port 30 increases, and hence when the flow rate of discharging the cooling medium increases, there is a concern that the power for the discharging operation may increase or the sufficient flow rate may not be ensured. The discharge structure 100 discharges the cooling medium from both the first discharge port 27 having a low pressure loss and the second discharge port 30 having a larger pressure loss than that of the first discharge port 27. In such a structure, the cooling medium easily flows to the first discharge port 27 having a low pressure loss. For this reason, the discharge structure 100 may efficiently discharge a large amount of the cooling medium from the first discharge port 27 having a low pressure loss, and may cool, lubricate, and clean the bearing 7A by causing a certain degree of the cooling medium to pass the bearing 7A. In order to further efficiently discharge the cooling medium from the first discharge port 27 having a low pressure loss, the discharge structure 100 adjusts the opening area SA of the first discharge port 27 to be larger than the opening area SC of the second discharge port 30 or adjusts the passageway cross-sectional area S2 of the second discharge passageway 31B to be larger than the passageway cross-sectional area S1 of the first discharge passageway 31A so as to discharge much cooling medium from the first discharge port 27 having a low pressure loss as described above. With such a configuration, the discharge structure 100 may discharge a larger amount of the cooling medium from the first discharge port 27. In this way, the discharge structure 100 is particularly effective for the case where the heat generation amount of the electric motor 1 increases and a large amount of the cooling medium is supplied to and is discharged from the electric motor. For example, the discharge structure 100 is effective for the electric motor which is used in the construction vehicle such as a hybrid excavator and a wheel loader.

The discharge passageway 32 extends outward in the radial direction of the shaft 8. For this reason, the discharge passageway 32 may have the filter 38 provided therein. With such a configuration, since there is no need to newly provide an installation space for the filter 38, it is possible to save the space. Further, since the discharge passageway 32 extends outward in the radial direction of the shaft 8, the discharge passageway 32 is opened to the side portion of the first flange 65. That is, the cooling medium which passes the first discharge port 27 is discharged to the outside of the housing 6 by changing its direction by 90° when the cooling medium flows into the discharge passageway 32. In this way, since the discharge structure 100 does not discharge the cooling medium to the lower side of the first flange 65, that is, in a direction in which the shaft 8 protrudes from the first flange 65, there is no need to dispose an additional structure at the output extraction side of the electric motor 1.

As illustrated in FIG. 7, in the first discharge port 27, the dimension L in the direction parallel to the radial direction of the shaft 8 is larger than the dimension W in the direction perpendicular to the radial direction of the shaft 8 (W<L). When the cooling medium passage area of the first discharge port 27 increases by the inequation of W>L, the inner diameter of the discharge passageway 32 needs to be increased, and hence the thickness of the first flange 65 increases. However, since the first discharge port 27 may be formed along the discharge passageway 32 by the inequation of W<L, it is possible to increase the cooling medium passage area of the first discharge port 27 without increasing the inner diameter of the discharge passageway 32.

As illustrated in FIG. 10, when the electric motor 1 is inclined with respect to the horizontal plane HP, the relation between the liquid level OP of the cooling medium and the side portion 66 and the first flange 65 of the housing 6 also changes. When the side portion 66 is provide with the cooling medium discharge port EX, the pump 21 suctions air inside the housing 6 in a case where the inclination of the electric motor 1 increases, and hence the cooling medium may not be discharged. The discharge structure 100 of the embodiment discharges the cooling medium from the first discharge port 27 which is provided at the inside of the housing 6 of the first flange 65. For this reason, the discharge structure 100 may discharge the cooling medium from the first discharge port 27 even when the electric motor 1 is inclined so that the cooling medium may not be discharged from the discharge port EX provided in the side portion 66. In this way, since the discharge structure 100 may discharge the cooling medium inside the housing 6 even when the inclination of the electric motor 1 with respect to the horizontal plane HP increases compared to the case where the cooling medium discharge port EX is provided in the side portion 66, the discharge structure is suitable for the construction vehicle which performs a work even in a slope.

As described above, it is preferable that the first discharge port 27 be provided at the center of the housing 6, that is, a position close to the rotation center axis Zr. In the embodiment, as illustrated in FIG. 7, the first discharge port 27 is provided at the inside in relation to an inner peripheral surface 615 of the side portion 66 of the housing 6. With such a configuration, the discharge structure 100 may further reliably discharge the cooling medium from the first discharge port 27 when the electric motor 1 is inclined. Further, when the discharge port EX is provided in the side portion 66, there is a need to increase the thickness of the side portion 66 in order to move the opening in the inner peripheral surface of the side portion 66 of the discharge port EX closer to the rotation center axis Zr, but it is difficult to realize this idea due to many limitations. In particular, when the side portion 66 has the water jacket 612, the limitation further increases. Since the discharge structure 100 provides the first discharge port 27 in the first flange 65, a degree in freedom in the arrangement of the first discharge port 27 is improved, and hence the first discharge port 27 may easily approach the rotation center axis Zr.

The first flange 65 and the side portion 66 are attached by threading bolts 40 illustrated in FIG. 5 into screw holes 41 illustrated in FIGS. 7 to 9. The screw holes 41 are provided at the same interval in the circumferential direction of the first flange 65 as the disk-like member. For this reason, the positional relation between the first flange 65 and the side portion 66 in the circumferential direction may be freely selected to a certain degree. As a result, the cooling medium discharge port 651 provided in the first flange 65 and the cooling water introduction port 613 provided in the side portion 66 may be disposed at the same side or different sides. In this way, since the discharge structure 100 is provided with the discharge passageway 32 connected to the cooling medium discharge port 651, the position of the cooling medium discharge port 651 may be adjusted independently from the side portion 66, a degree in freedom when mounting the electric motor 1 on the hybrid excavator 10 and the like is improved.

As described above, in the embodiment, the cooling medium in the housing is discharged from both the first discharge port which is provided at the lower portion of the housing of the electric motor and the second discharge port which is provided adjacent to the bearing and through which the cooling medium in the housing flows out of the bearing. With such a configuration, it is possible to decrease the amount of the cooling medium remaining in the housing and to decrease the amount of the foreign matter accumulated in a portion adjacent to the bearing in one end of the shaft supported by the bearing, and more specifically, the second discharge port. In particular, the invention is suitable for the case where the electric motor is vertically disposed, that is, the shaft faces the gravity action direction. Further, in the embodiment, the electric motor having the cooling passageway inside the rotor core is exemplified, but the cooling medium discharge structure of the embodiment may be applied to any type of the electric motor cooling structure. That is, when the bearing and the cooling medium are provided in the housing of the electric motor, the cooling medium discharge structure of the embodiment may be applied thereto.

REFERENCE SIGNS LIST 1 electric motor
2 cooling structure
6 housing
7A, 7B bearing
8 shaft
9 stator
10 hybrid excavator
21 pump
22 passageway
23 bearing passageway
24, 38 filter
25 relief passageway
26 relief valve
27 first discharge port
28 rotor passageway
29 bearing outside space
30 second discharge port
31A first discharge passageway
31B second discharge passageway
32 discharge passageway
34 seal
35 gasket
39 oil accumulation portion
61 second flange
65 first flange
66 side portion
82 rotor core
83, 84 balance plate
91 stator core
92 coil
100 discharge structure
612 water jacket
615 inner peripheral surface
651 cooling medium discharge port
811 axial passageway 812 radial passageway
813 shaft inside cooling medium passageway
821 rotor core penetration hole
831 balance plate penetration hole
841 concave portion

The invention claimed is:

1. An electric motor cooling medium discharge structure for discharging a cooling medium from a housing, the cooling medium cooling an electric motor, the discharge structure comprising:
 a shaft with an attached rotor core disposed in the housing;
 a first discharge port disposed in a stationary end side member supporting the shaft through a bearing at one end of the housing, wherein the first discharge port is configured to guide the cooling medium through the housing;
 a second discharge port through which the cooling medium in the housing passes and lubricates the bearing, wherein the bearing is provided in the end side member and supported by the end side member; and
 a discharge passageway through which the cooling medium passing through the first discharge port and the second discharge port is discharged out of the housing,
 wherein the electric motor is vertically installed, the first discharge port and the second discharge port are provided at a lower side of the housing, and the shaft extends through the stationary end side member, and
 wherein a seal is disposed between the stationary end side member and the shaft, the stationary end side member, the bearing, and the seal together at least partially define a bearing outside space, and the second discharge port is in fluid communication with the bearing outside space.

2. The electric motor cooling medium discharge structure according to claim 1, wherein an opening area of the first discharge port is larger than an opening area of the second discharge port.

3. The electric motor cooling medium discharge structure according to claim 1, wherein the first discharge port is disposed radially inward of an inner peripheral surface of the housing.

4. The electric motor cooling medium discharge structure according to claim 1, wherein the discharge passageway extends outward in the radial direction of the shaft.

5. The electric motor cooling medium discharge structure according to claim 1, wherein the first discharge port has a larger dimension in a direction parallel to the radial direction of the shaft than a dimension in a direction perpendicular to the radial direction of the shaft.

6. The electric motor cooling medium discharge structure according to claim 1, wherein the end side member is a disk-like member attached to one end of the housing.

7. The electric motor cooling medium discharge structure according to claim 1, wherein the discharge passageway includes a filter for removing foreign matter from the cooling medium.

8. The electric motor cooling medium discharge structure according to claim 1, wherein the discharge passageway is common to the first discharge port and the second discharge port.

9. An electric motor comprising the electric motor cooling medium discharge structure according to claim 1.

10. An electric motor which rotationally drives an upper swing body of a construction machine having a shaft attached with a rotor core disposed in a housing, the electric motor comprising:
 a first discharge port disposed in a stationary end side member supporting the shaft through a bearing at one end of the housing, and radially inward of an inner peripheral surface of the housing, wherein the first discharge port is configured to guide the cooling medium through the housing;
 a second discharge port through which the cooling medium in the housing passes and lubricates the bearing, wherein the bearing is provided in the end side member and supported by the end side member; and
 a discharge passageway which extends outward in the radial direction of the shaft and discharges the cooling medium passing the first discharge port and the second discharge port out of the housing,
 wherein the first discharge port has a larger opening area than an opening area of the second discharge port and a larger dimension in a direction parallel to the radial direction of the shaft than a dimension in a direction perpendicular to the radial direction of the shaft,
 wherein the electric motor is vertically installed, the first discharge port and the second discharge port are provided at a lower side of the housing, and the shaft extends through the stationary end side member, and
 wherein a seal is disposed between the stationary end side member and the shaft, the stationary end side member, the bearing, and the seal together at least partially define a bearing outside space, and the second discharge port is in fluid communication with the bearing outside space.

* * * * *